US012791081B2

(12) United States Patent
Koizumi et al.

(10) Patent No.: US 12,791,081 B2
(45) Date of Patent: Nov. 10, 2026

(54) FRICTION DISC AND DAMPER DEVICE

(71) Applicant: EXEDY Corporation, Neyagawa (JP)

(72) Inventors: Naoya Koizumi, Neyagawa (JP); Hiroshi Uehara, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 180 days.

(21) Appl. No.: 18/920,913

(22) Filed: Oct. 20, 2024

(65) Prior Publication Data

US 2025/0163993 A1 May 22, 2025

(30) Foreign Application Priority Data

Nov. 17, 2023 (JP) ................................ 2023-196073

(51) Int. Cl.
*F16F 15/129* (2006.01)
*F16D 7/02* (2006.01)

(52) U.S. Cl.
CPC .......... *F16F 15/1297* (2013.01); *F16D 7/025* (2013.01); *F16F 2230/0035* (2013.01)

(58) Field of Classification Search
CPC .. F16F 15/129; F16F 15/1292; F16F 15/1392; F16F 15/1395; F16F 15/1297; F16F 15/1397; F16F 15/139; F16D 7/024; F16D 7/025; F16D 7/027; F16D 43/213; F16D 43/215; F16D 43/216
USPC ................................ 464/68.4, 68.41, 45, 46
See application file for complete search history.

(56) References Cited

U.S. PATENT DOCUMENTS

| | | | | |
|---|---|---|---|---|
| 4,377,225 A * | 3/1983 | Lech, Jr. | F16D 13/64 192/107 C |
| 4,591,041 A * | 5/1986 | Valier | F16F 15/32 464/68.4 |
| 10,203,019 B2 * | 2/2019 | Nasu | F16F 15/12353 |
| 10,948,024 B1 * | 3/2021 | Uehara | F16F 15/1297 |
| 2020/0318691 A1 | 10/2020 | Uehara | |

FOREIGN PATENT DOCUMENTS

| | | | |
|---|---|---|---|
| DE | 102020126654 A1 * | 4/2022 | F16F 15/1297 |
| GB | 2298473 A * | 9/1996 | F16F 15/129 |
| JP | 2020169683 A | 10/2020 | |

* cited by examiner

*Primary Examiner* — Amber R Anderson
*Assistant Examiner* — Zachary A Hall
(74) *Attorney, Agent, or Firm* — United IP Counselors, LLC

(57) ABSTRACT

A friction disc producible at low cost is disclosed. A support plate includes a first engaging protrusion, a through-hole, a second engaging protrusion, and a recess. The first engaging protrusion protrudes from a first lateral surface of the support plate to a first side in an axial direction. The through-hole extends inside the first engaging protrusion in the axial direction. The second engaging protrusion protrudes from a second lateral surface of the support plate to a second side in the axial direction. The recess overlaps with the second engaging protrusion as seen in the axial direction. The recess is recessed on the first lateral surface to the second side in the axial direction. A first friction material includes a first engaging recess engaged with the first engaging protrusion. A second friction material includes a second engaging recess engaged with the second engaging protrusion.

13 Claims, 11 Drawing Sheets

FRICTION DISC AND DAMPER DEVICE

CROSS-REFERENCE TO RELATED APPLICATIONS

This application is based on and claims the priority benefit of Japanese application 2023-196073 filed on Nov. 17, 2023, the contents of which are incorporated herein by reference.

TECHNICAL FIELD

The claimed invention relates to a friction disc and a damper device.

BACKGROUND

Devices such as a damper device include a friction disc for engagement by friction. The friction disc includes a support plate and a pair of friction materials. The pair of friction materials is fixed to the support plate by rivets to be rotated unitarily therewith. See, for example, Japan Laid-open Patent Application Publication No. 2020-169683.

SUMMARY OF THE INVENTION

It has been demanded to produce the friction disc at a low cost. In view of this, it is an object of the claimed invention to provide a friction disc producible at a low cost.

A friction disc according to a first aspect includes a support plate, a first friction material, and a second friction material. The support plate includes a first lateral surface and a second lateral surface. The first lateral surface faces a first side in an axial direction. The second lateral surface faces a second side in the axial direction. The first friction material is attached to the first lateral surface of the support plate. The second friction material is attached to the second lateral surface of the support plate. The support plate includes a first engaging protrusion, a through-hole, a second engaging protrusion, and a recess. The first engaging protrusion protrudes from the first lateral surface to the first side in the axial direction. The through-hole extends inside the first engaging protrusion in the axial direction. The second engaging protrusion protrudes from the second lateral surface to the second side in the axial direction. The recess is disposed to overlap with the second engaging protrusion as seen in the axial direction. The recess is recessed on the first lateral surface to the second side in the axial direction. The first friction material includes a first engaging recess engaged with the first engaging protrusion. The second friction material includes a second engaging recess engaged with the second engaging protrusion.

According to the configuration, the first engaging protrusion is engaged with the first engaging recess, whereby the first friction material is made unitarily rotatable with the support plate. Likewise, the second engaging protrusion is engaged with the second engaging recess, whereby the second friction material is made unitarily rotatable with the support plate. As a result, rivets that are used to make the first and second friction materials unitarily rotatable with the support plate can be omitted, whereby the friction disc can be produced at a low cost. Additionally, holes necessary for processing with the rivets are not required to be provided in the first and second friction materials; hence, the first and second friction materials can be reduced in width, whereby the friction disc can be produced at a low cost as well.

A friction disc according to a second aspect relates to the friction disc according to the first aspect and is configured as follows. The first engaging protrusion includes a first body and a first hold-down portion. The first body extends in the axial direction. The first hold-down portion extends from an outer peripheral surface of a distal end of the first body to hold down the first friction material.

A friction disc according to a third aspect relates to the friction disc according to the first or second aspect and is configured as follows. At least one of the first engaging protrusion and the second engaging protrusion has an elliptical shape as seen in the axial direction.

A friction disc according to a fourth aspect relates to the friction disc according to any of the first to third aspects and is configured as follows. The support plate includes a slit and an anchor. The slit extends inward in a radial direction from an outer peripheral surface of the support plate. The anchor protrudes from an edge of the slit to the second side in the axial direction. The anchor bites into the second friction material.

A friction disc according to a fifth aspect relates to the friction disc according to any of the first to fourth aspects and is configured as follows. The support plate includes a plurality of first slits, a plurality of second slits, a plurality of first anchors, and a plurality of second anchors. Each of the plurality of first slits extends inward in a radial direction from an outer peripheral surface of the support plate. The plurality of first slits are spaced apart from each other at intervals in a circumferential direction. Each of the plurality of second slits extends inward in the radial direction from the outer peripheral surface of the support plate. The second slits are spaced apart from each other at intervals in the circumferential direction. Each of the first anchors protrudes from an edge of a corresponding on of the plurality of first slits to the first side in the axial direction. The plurality of first anchors bite into the first friction material. Each of the plurality of second anchors protrudes from an edge of a corresponding one of the plurality of second slits to the second side in the axial direction. The second anchors bite into the second friction material.

A friction disc according to a sixth aspect relates to the friction disc according to the fifth aspect and is configured as follows. The first slits and the second slits are alternately disposed in the circumferential direction.

A friction disc according to a seventh aspect relates to the friction disc according to the fifth or sixth aspect and is configured as follows. At least the first engaging protrusion or the second engaging protrusion is disposed between one of the first slits and one of the second slits in the circumferential direction.

A friction disc according to an eighth aspect relates to the friction disc according to any of the first to seventh aspects and is configured as follows. The first engaging recess includes a small diameter portion and a large diameter portion. The small diameter portion is opened toward the support plate in the axial direction. The small diameter portion accommodates the first engaging protrusion. The large diameter portion is connected to the small diameter portion in the axial direction. The large diameter portion is opened to an opposite side of the support plate. The large diameter portion is larger in dimension than the small diameter portion as seen in the axial direction.

A friction disc according to a ninth aspect relates to the friction disc according to any of the first to eighth aspects and is configured as follows. The second engaging recess includes a large diameter portion and a small diameter portion. The large diameter portion is opened toward the support plate in the axial direction. The large diameter portion accommodates the second engaging protrusion. The small diameter portion is connected to the large diameter portion in the axial direction. The small diameter portion is opened to an opposite side of the support plate. The small diameter portion is smaller in dimension than the large diameter portion as seen in the axial direction. The small diameter portion is smaller in dimension than the second engaging protrusion as seen in the axial direction.

A friction disc according to a tenth aspect relates to the friction disc according to any of the first to ninth aspects and is configured as follows. The support plate includes a plurality of the first engaging protrusions and a plurality of the second engaging protrusions. The first engaging protrusions and the second engaging protrusions are alternately disposed in a circumferential direction.

A friction disc according to an eleventh aspect relates to the friction disc according to any of the first to tenth aspects and is configured as follows. The first friction material includes a first slide surface and a first attachment surface. The first slide surface faces the first side in the axial direction. The first attachment surface faces the second side in the axial direction. The first attachment surface comes contacts the support plate. The first attachment surface is larger in surface roughness than the first slide surface.

A damper device according to a twelfth aspect includes a damper unit and a torque limiter unit. The damper unit includes an input rotor, an output rotor, an elastic member, and the friction disc recited in any of the first to eleventh aspects. The elastic member elastically couples the input rotor and the output rotor. The friction disc is attached to either the input rotor or the output rotor. The torque limiter unit is configured to be engaged by friction with the friction disc. The torque limiter unit sandwiches the friction disc therein in the axial direction.

A damper device according to a thirteenth aspect relates to the damper device according to the twelfth aspect and is configured as follows. The torque limiter unit includes a pressure plate and an urging member. The urging member urges the pressure plate toward the friction disc. The urging member includes a contact portion coming in contact with the pressure plate. The contact portion overlaps with the first engaging protrusion as seen in the axial direction.

Overall, according to the claimed invention, the friction disc is made producible at a low cost.

DETAILED DESCRIPTION

A friction disc 5 and a damper device 100 incorporating it in accordance with the claimed invention will be hereinafter explained with reference to the drawings. It should be noted that in the following explanation, the term "axial direction" refers to an extending direction of a rotational axis O for both the friction disc 5 and the damper device 100. On the other hand, the term "circumferential direction" refers to a circumferential direction of an imaginary circle about the rotational axis O, whereas the term "radial direction" refers to a radial direction of the imaginary circle about the rotational axis O. Besides, the term "first side in the axial direction" means the left side in FIG. 2, whereas the term "second side in the axial direction" means the right side in FIG. 2.

Figure 1:
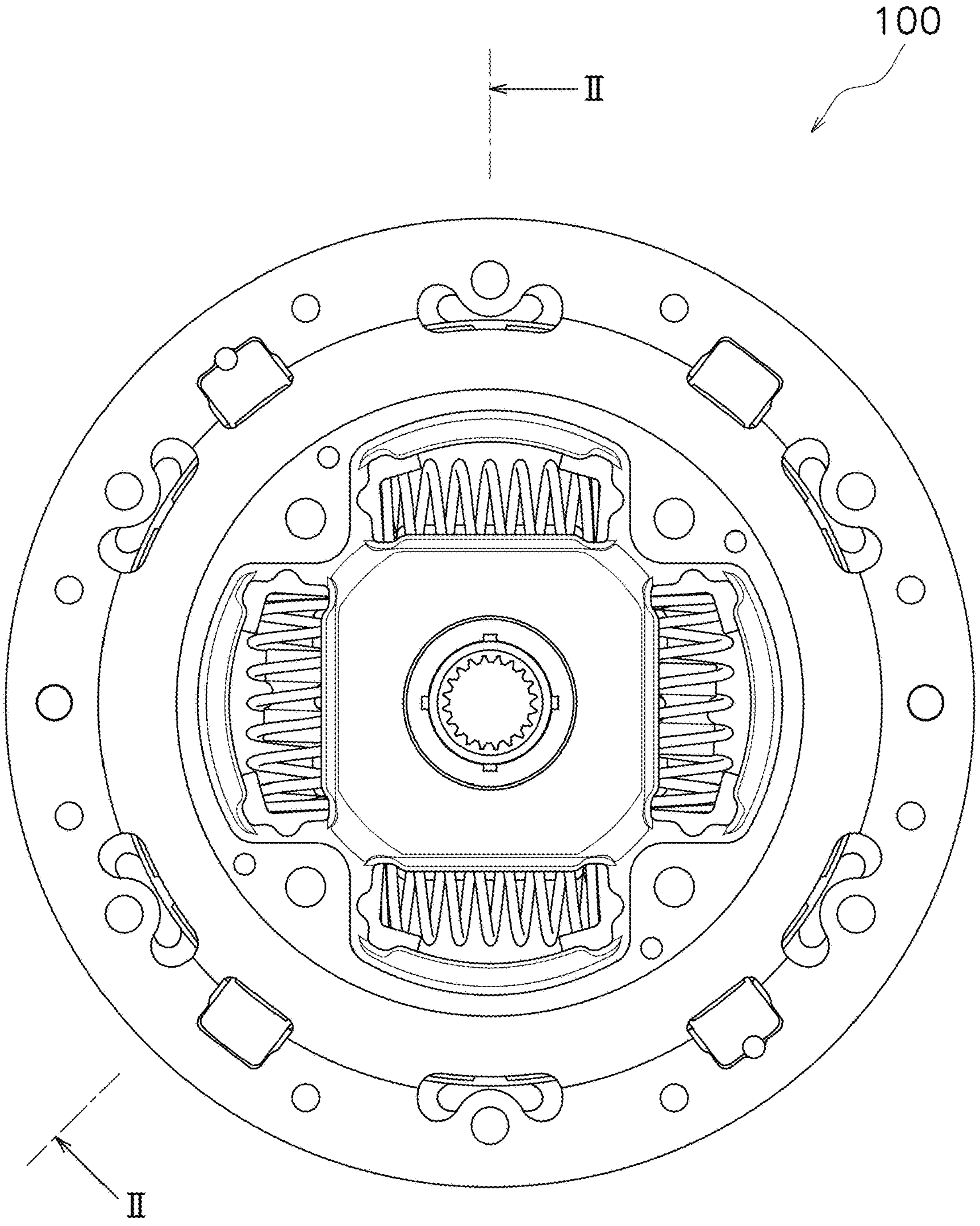
FIG. 1 is a front view of a damper device.
Figure 2:
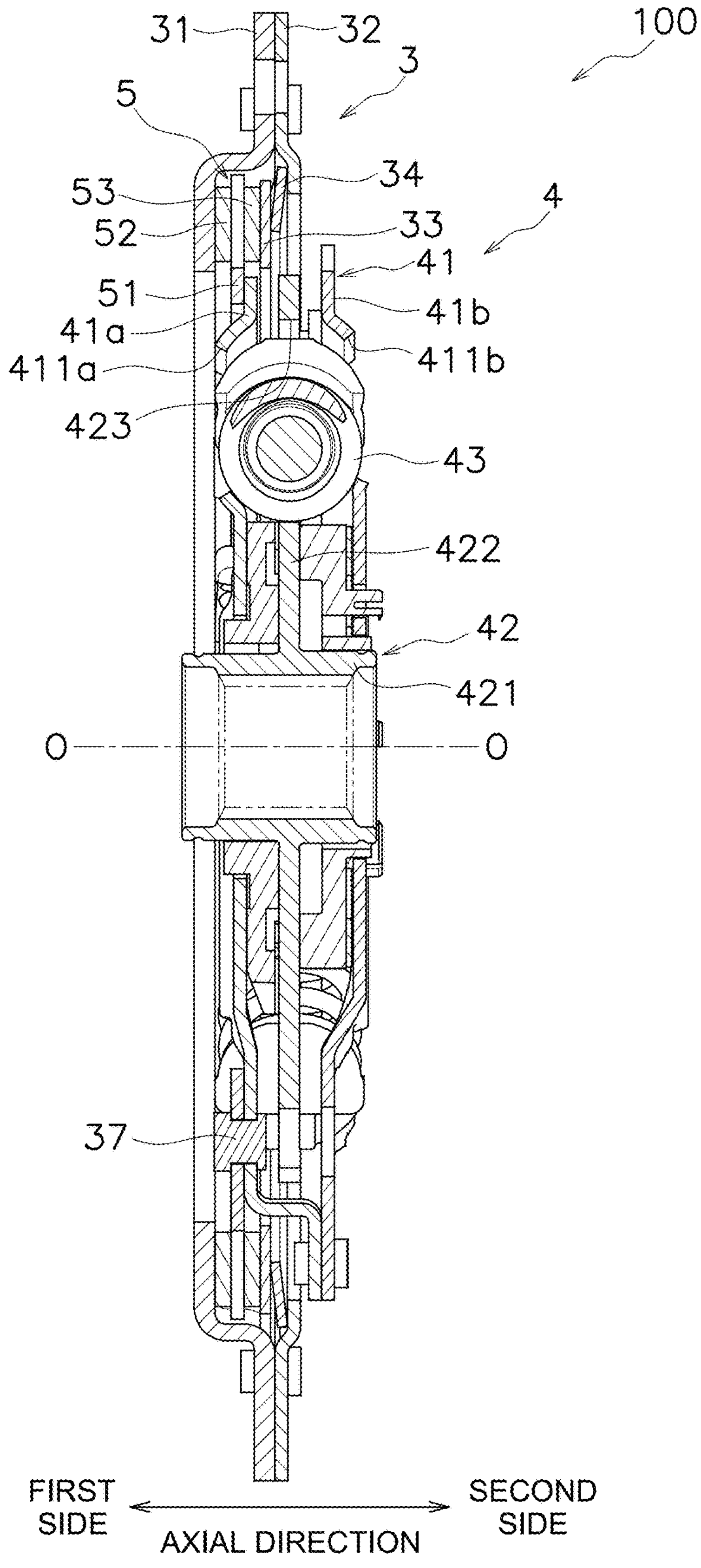
FIG. 2 is a cross-sectional view of the damper device taken along the angled lines II-II in FIG. 1.

FIG. 1 is a front view of the damper device 100, whereas FIG. 2 is a cross-sectional view of the damper device 100 taken along angled cut lines II-II in FIG. 1. As shown in FIGS. 1 and 2, the damper device 100 includes a torque limiter unit 3 and a damper unit 4. Basically, the torque limiter unit 3 and the damper unit 4 are unitarily rotated with each other. The damper device 100 is installed between an internal combustion engine (omitted in the illustration) and an output-side member (omitted in the illustration). It should be noted that the output-side member refers, for instance, to an electric motor, a transmission, and so forth. The damper device 100 is attached to a flywheel (omitted in the illustration). For example, the internal combustion engine is disposed on the left side of the damper device 100 in FIG. 2, whereas the output-side member is disposed on the right side of the damper device 100 in FIG. 2. The damper device 100 is configured to limit a torque transmitted between the internal combustion engine and the output-side member and to attenuate torque fluctuations.

[Damper Unit]

The damper unit 4 is attached to the torque limiter unit 3. The damper unit 4 is configured to attenuate rotational fluctuations. The damper unit 4 includes an input rotor 41, an output rotor 42, elastic members 43, and the friction disc 5.

<Input Rotor>

The input rotor 41 includes a first plate 41*a* and a second plate 41*b*. Each of the first and second plates 41*a* and 41*b* is an annular member including a center hole. The first and second plates 41*a* and 41*b* are unitarily rotated with each other. Additionally, the first and second plates 41*a* and 41*b* are axially immovable relative to each other.

The first and second plates 41*a* and 41*b* are spaced apart from each other at an interval in the axial direction. The second plate 41*b* is disposed on the second side of the first plate 41*a* in the axial direction.

The first plate 41*a* includes a plurality of window portions 411*a*, while the second plate 41*b* includes a plurality of window portions 411*b*. For example, in the presently preferred embodiment, the first plate 41*a* includes four window portions 411*a*, while the second plate 41*b* includes four window portions 411*b*. However, the window portions 411*a*, 411*b* are not limited in number to this.

Not only the window portions 411*a* but also the window portions 411*b* are spaced apart from each other at intervals in the circumferential direction. Each window portion 411*a*, 411*b* is configured to accommodate each elastic member 43.

<Output Rotor>

The output rotor 42 is configured to transmit torque inputted thereto from the input rotor 41 to the output-side member. The output rotor 42 is disposed axially between the first and second plates 41*a* and 41*b*. The output rotor 42 is disposed to be rotatable relative to the first and second plates 41*a* and 41*b*.

The output rotor 42 includes a hub 421 and a flange plate 422. The hub 421 and the flange plate 422 are integrated as a single member, but alternatively, they may be provided as separate members from each other.

The hub 421 has a tubular shape and is disposed in the center hole of the first plate 41*a* and that of the second plate 41*b*. The hub 421 is provided with a spline hole, extending in the axial direction, in an inner peripheral part thereof. The spline hole enables an input shaft of the output-side member to be spline-coupled thereto.

The flange plate 422 extends radially from the outer peripheral surface of the hub 421. The flange plate 422 has an annular shape. The flange plate 422 is disposed to be rotatable relative to the first and second plates 41*a* and 41*b*. The flange plate 422 is disposed axially between the first and second plates 41*a* and 41*b*.

The flange plate 422 includes a plurality of accommodation holes 423. It should be noted that in the presently preferred embodiment, the flange plate 422 includes four accommodation holes 423; however, the accommodation holes 423 are not limited in number to this. The accommodation holes 423 are spaced apart from each other at intervals in the circumferential direction. Each accommodation hole 423 is configured to accommodate each elastic member 43. When viewed axially, each accommodation hole 423 is disposed to overlap with each pair of window portions 411*a* and 411*b*.

<Elastic Members>

The elastic members 43 are configured to elastically couple the input rotor 41 and the output rotor 42 in a rotational direction. Each elastic member 43 may, for instance, be a coil spring.

Each elastic member 43 is accommodated in an accommodation hole 423 of the output rotor 42. Additionally, each elastic member 43 is accommodated not only in a corresponding window portion 411*a* of the first plate 41*a* but also in a corresponding window portion 411*b* of the second plate 41*b*.

<Friction Disc>

The friction disc 5 is attached to the outer peripheral end of the input rotor 41. In particular, the friction disc 5 is attached to the first plate 41*a* by fastening members 37. It should be noted that the friction disc 5 may be attached to the second plate 41*b*. The friction disc 5 is unitarily rotated with the input rotor 41. It should be noted that rivets can be used as exemplary fastening members 37.

Figure 3:
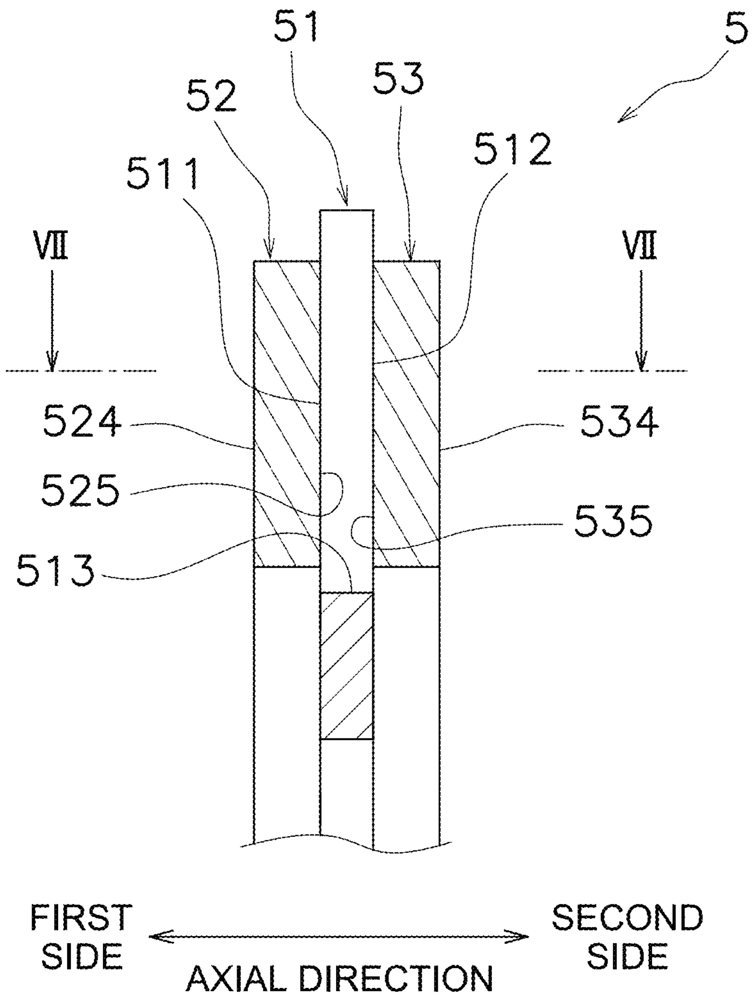
FIG. 3 is a cross-sectional view of an upper portion of a friction disc used in the damper device shown in FIGS. 1 and 2.

FIG. 3 is an enlarged cross-sectional view of the friction disc 5. As shown in FIGS. 2 and 3, the friction disc 5 is rotatable about the rotational axis O. The friction disc 5 has an annular shape. The friction disc 5 includes a support plate 51, a first friction material 52, and a second friction material 53. The support plate 51, the first friction material 52, and the second friction material 53 are unitarily rotated with each other.

<Support Plate>

Figure 4:
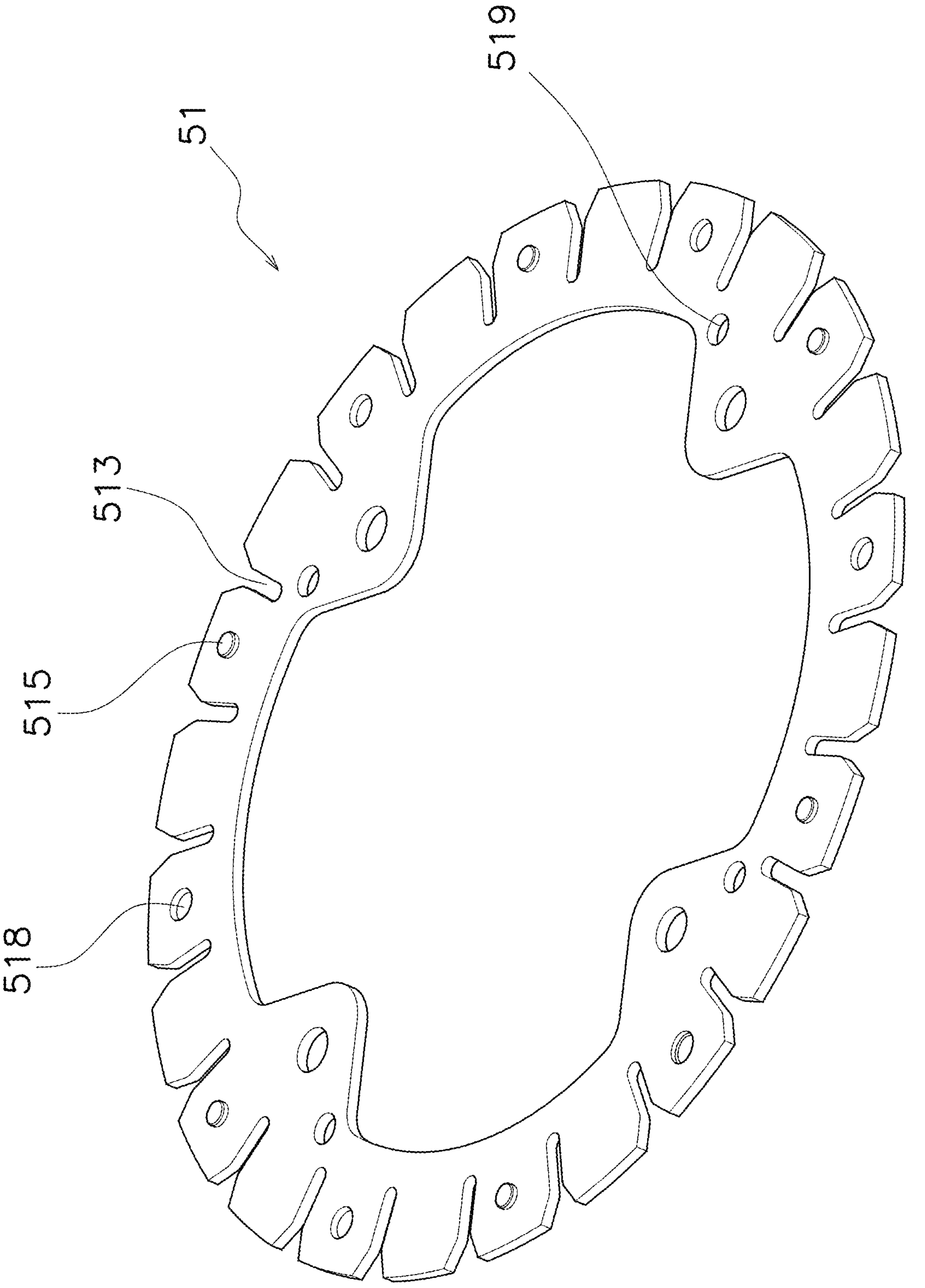
FIG. 4 is a perspective view of a support plate used with the friction disk illustrated in FIG. 3.
Figure 5:
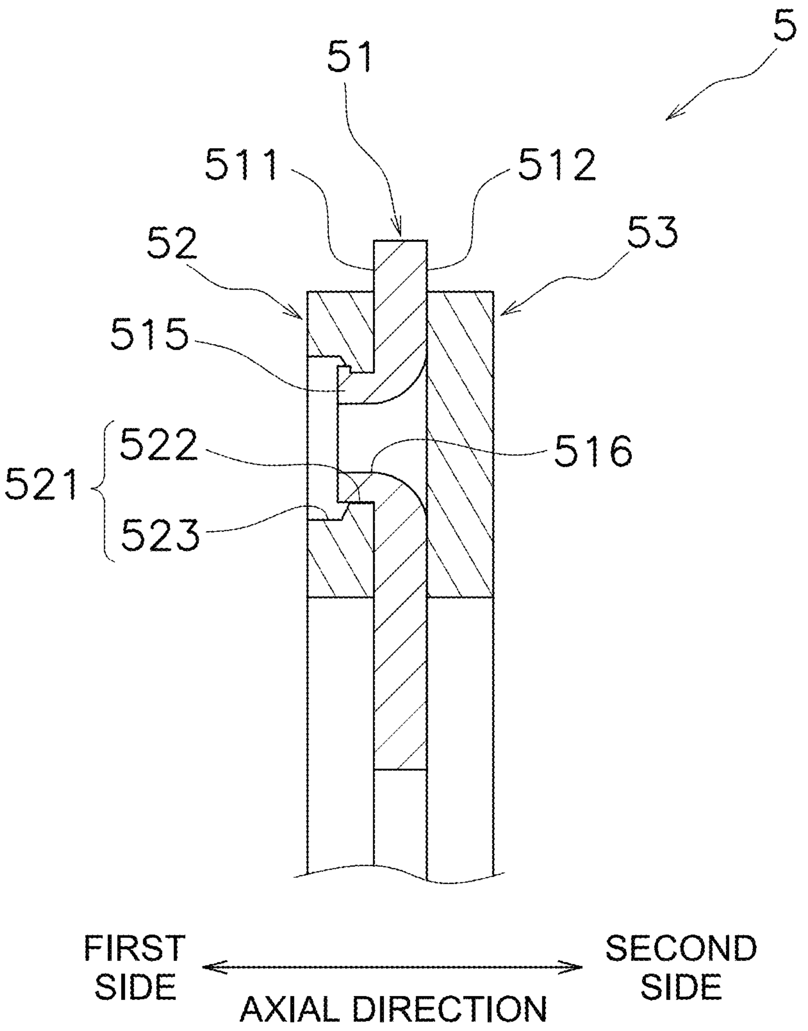
FIG. 5 is a cross-sectional view of a portion of the friction disc.
Figure 6:
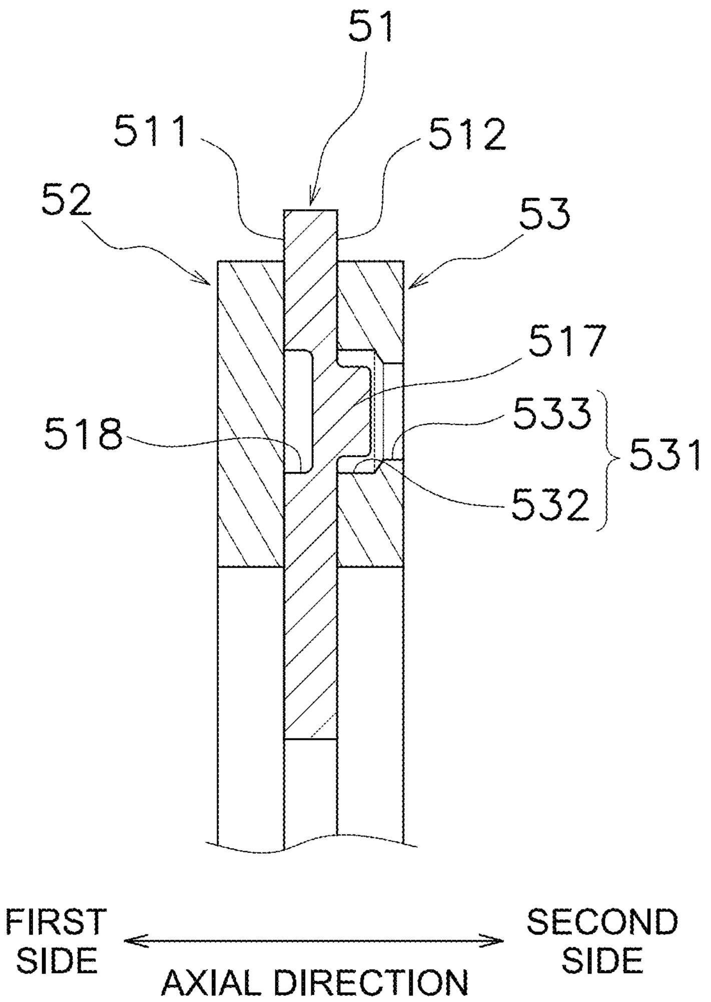
FIG. 6 is a cross-sectional view of a portion of the friction disc.
Figure 7:
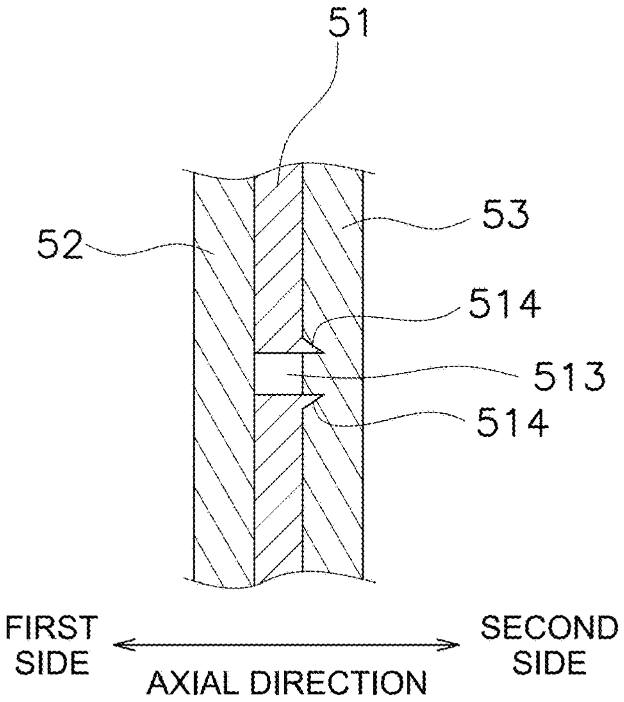
FIG. 7 is a cross-sectional view of a portion of the friction disc taken along line VII-VII in FIG. 3.

FIG. 4 is a perspective view of the support plate 51; FIGS. 5 and 6 are enlarged cross-sectional views of the friction disc 5 for showing portions engaged therein; and FIG. 7 is a cross-sectional view of the friction disc 5 taken along line VII-VII in FIG. 3. As shown in FIGS. 3 to 7, the support plate 51 is an annular plate. The support plate 51 is disposed to be rotatable about the rotational axis O.

The support plate 51 is attached to the first plate 41*a*. For example, the support plate 51 is attached to the first plate 41*a* by the fastening members 37. It should be noted that the support plate 51 is provided separately from the first plate 41*a*; however, the support plate 51 may be integrated with the first plate 41*a* as a single member.

The support plate 51 includes a first lateral surface 511, a second lateral surface 512, a plurality of slits 513, a plurality of anchors 514, a plurality of first engaging protrusions 515, a plurality of through-holes 516, a plurality of second engaging protrusions 517, and a plurality of recesses 518. Additionally, the support plate 51 includes a plurality of insertion holes 519 for inserting therein a jig for use in positioning.

The first lateral surface 511 refers to one of the two lateral surfaces of the support plate 51 that faces the first side in the axial direction. When axially seen, the first lateral surface 511 has an annular shape. The first lateral surface 511 is constant in axial position without being provided with any steps. In other words, the first lateral surface 511 is located on an identical plane as a whole.

The second lateral surface 512 refers to the other of the two lateral surfaces of the support plate 51 that faces the second side in the axial direction. The second side in the axial direction is opposite to the first side in the axial direction. When axially seen, the second lateral surface 512 has an annular shape. The second lateral surface 512 is constant in axial position without being provided with any steps. In other words, the second lateral surface 512 is located on an identical plane as a whole.

The slits 513 extend radially inwardly from the outer peripheral surface of the support plate 51. The slits 513 are spaced apart from each other at intervals in the circumferential direction. The slits 513 penetrate the support plate 51 in a thickness direction of the support plate 51.

As shown in FIG. 7, the anchors 514 protrude from the edges of the slits 513 to the second side in the axial direction. It should be noted that in the presently preferred embodiment, the anchors 514 protrude to only the second side in the axial direction, but furthermore or alternatively, they may protrude to the first side in the axial direction. Each anchor 514 protrudes by an amount, for instance, of about 0.1 to 0.5 mm, albeit not particularly limited in protruding amount thereto.

Each anchor 514 is provided along the edge of a corresponding one of the slits 513. It should be noted that each anchor 514 may be shaped either continuously or intermittently along the edge of the corresponding one of the slits 513. The anchors 514 protrude from the second lateral surface 512 of the support plate 51 to the second side in the axial direction. The anchors 514 bite into the second friction material 53. With the anchors 514 described above, the support plate 51 and the second friction material 53 are made unitarily rotatable as reliably as possible. It should be noted that the anchors 514 may be provided on the edges of all the slits 513 or, alternatively, may be provided on the edges of some of the slits 513. When protruding to the first side in the axial direction, the anchors 514 bite into the first friction material 52.

Figure 8:
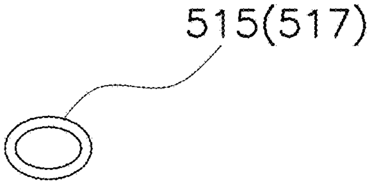
FIG. 8 is a view of each of first engaging protrusions or each of second engaging protrusions as seen in an axial direction.

As shown in FIGS. 4 and 5, the first engaging protrusions 515 protrude from the first lateral surface 511 to the first side in the axial direction. Each first engaging protrusion 515 is disposed between a pair of slits 513 that are adjacent to each other in the circumferential direction. When axially seen, each first engaging protrusion 515 has a circular shape. It should be noted that each first engaging protrusion 515 can be made in the shape of an ellipse as well (see FIG. 8).

Each through-hole 516 extends inside each first engaging protrusion 515 in the axial direction. Because of this, each first engaging protrusion 515 is made in the shape of a cylinder extending in the axial direction. It should be noted that, when axially seen, each through-hole 516 has a circular shape. Each through-hole 516 penetrates the support plate 51 in the axial direction. Each first engaging protrusion 515 and the through-hole 516 provided therein can be formed, for instance, by burring.

Figure 9:
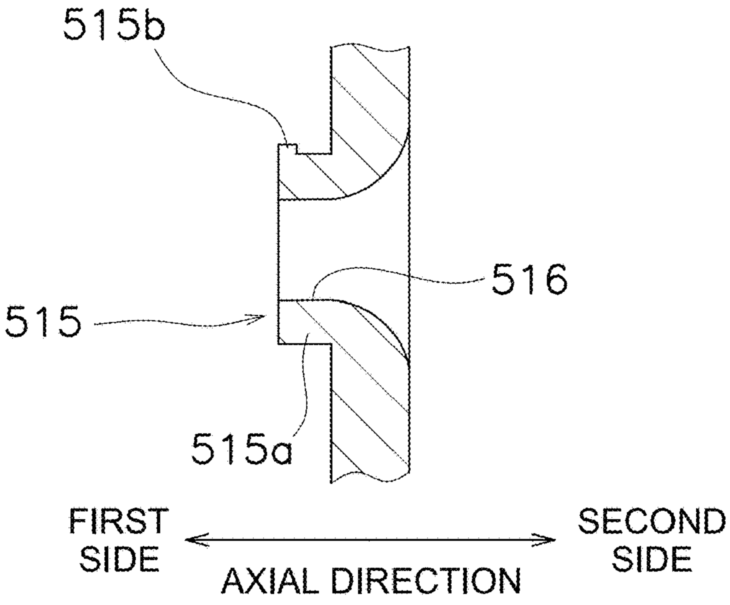
FIG. 9 is an enlarged cross-sectional view of each first engaging protrusion.
Figure 10:
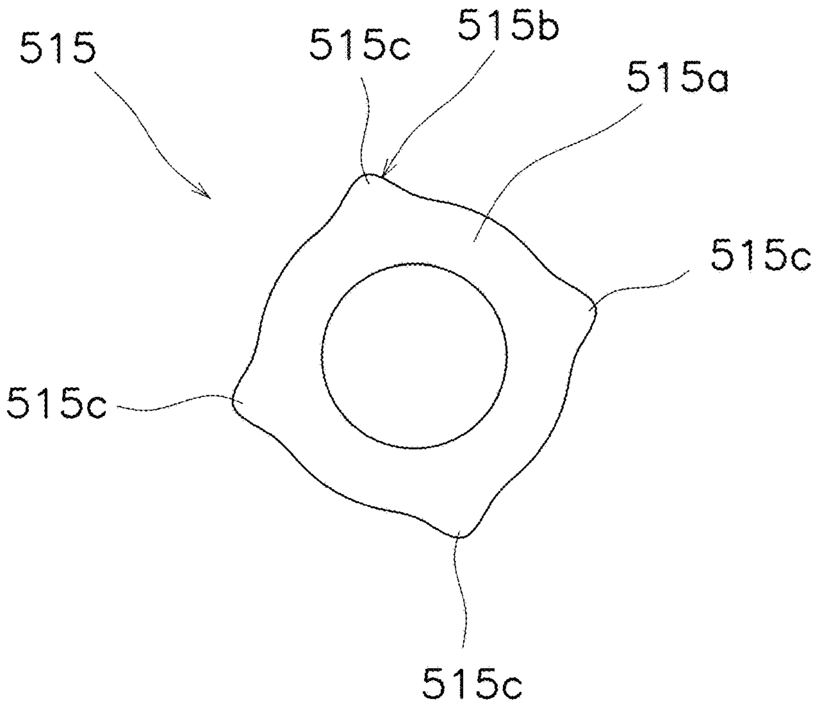
FIG. 10 is a front view of each first engaging protrusion.

FIG. 9 is an enlarged cross-sectional view of each first engaging protrusion 515, whereas FIG. 10 is a view of each first engaging protrusion 515 seen along the axial direction. As shown in FIGS. 9 and 10, each first engaging protrusion 515 includes a first body 515*a* and a first hold-down portion 515*b*. The first body 515*a* extends in the axial direction. The first body 515*a* has a cylindrical shape. In other words, each through-hole 516 penetrates the first body 515*a* in the axial direction.

The first hold-down portion 515*b* extends outward from the outer peripheral surface of the distal end of the first body 515*a* (i.e., the end disposed on the first side in the axial direction). The first hold-down portion 515*b* holds down the first friction material 52. Specifically, the first hold-down portion 515*b* is formed by swaging the distal end of each first engaging protrusion 515. The first friction material 52 is fixed to the support plate 51, while being sandwiched between the first hold-down portion 515*b* and the first lateral surface 511 of the support plate 51. The first hold-down portion 515*b* is composed of a plurality of hold-down pieces 515*c*. It should be noted that the first hold-down portion 515*b* may be made in the shape of a single annulus. The first hold-down portion 515*b* holds down a step formed in a boundary between a small diameter portion 522 (to be described) and a large diameter portion 523 (to be described).

As shown in FIG. 6, the second engaging protrusions 517 protrude from the second lateral surface 512 to the second side in the axial direction. Each second engaging protrusion 517 is made in the shape of a solid column. When axially seen, each second engaging protrusion 517 has a circular shape. It should be noted that each second engaging protrusion 517 can be made in the shape of an ellipse as well (see FIG. 8).

Each second engaging protrusion 517 is disposed between a pair of slits 513 that are adjacent to each other in the circumferential direction. The second engaging protrusions 517 and the first engaging protrusions 515 are alternately disposed in the circumferential direction. In other words, the second engaging protrusions 517 and the through-holes 516 are alternately disposed on the second lateral surface 512 in the circumferential direction.

The recesses 518 are provided on the first lateral surface 511 of the support plate 51. The recesses 518 are recessed on the first lateral surface 511 toward the second side in the axial direction. In other words, the recesses 518 are opened to the first side in the axial direction. It should be noted that the recesses 518 do not penetrate the support plate 51.

When axially seen, each recess 518 has a circular shape. When axially seen, each recess 518 overlaps with one of the second engaging protrusions 517. When axially seen, each recess 518 is larger in dimension than the corresponding second engaging protrusion 517. The second engaging protrusions 517 and the recesses 518 can be formed, for instance, by embossing.

The recesses 518 and the through-holes 516 are alternately disposed in the circumferential direction. In other words, the recesses 518 and the first engaging protrusions 515 are alternately disposed on the first lateral surface 511 in the circumferential direction.

<First and Second Friction Materials>

As shown in FIGS. 2, 3, and 5 to 7, the first friction material 52 has an annular shape. The first friction material 52 is attached to the first lateral surface 511 of the support plate 51. The first friction material 52 is unitarily rotated with the support plate 51. Because of this, the friction disc 5 is configured to be engaged by friction with a side plate 31 through the first friction material 52.

The first friction material 52 includes a first slide surface 524 and a first attachment surface 525. The first slide surface 524 refers to a surface facing the opposite side of the support plate 51 in the axial direction. In other words, the first slide surface 524 faces the first side in the axial direction. The first slide surface 524 is in contact with the side plate 31. When the friction disc 5 is slid against the torque limiter unit 3, the first slide surface 524 is slid against the side plate 31.

The first attachment surface 525 refers to a surface facing the support plate 51 in the axial direction. In other words, the first attachment surface 525 faces the second side in the axial direction. The first attachment surface 525 is in contact with the support plate 51.

The first attachment surface 525 is different in surface roughness from the first slide surface 524. For example, the first attachment surface 525 is larger in surface roughness (arithmetic average roughness) than the first slide surface 524. For example, the first attachment surface 525 can be made larger in surface roughness relative to the first slide surface 524 by polishing the first slide surface 524 without polishing the first attachment surface 525.

The second friction material 53 has an annular shape. The second friction material 53 is attached to the second lateral surface 512 of the support plate 51. The second friction material 53 is unitarily rotated with the support plate 51. Because of this, the friction disc 5 is configured to be engaged by friction with a pressure plate 33 through the second friction material 53.

The second friction material 53 includes a second slide surface 534 and a second attachment surface 535. The second slide surface 534 refers to a surface facing the opposite side of the support plate 51 in the axial direction. In other words, the second slide surface 534 faces the second side in the axial direction. The second slide surface 534 is in contact with the pressure plate 33. When the friction disc 5 is slid against the torque limiter unit 3, the second slide surface 534 is slid against the pressure plate 33.

The second attachment surface 535 refers to a surface facing the support plate 51 in the axial direction. In other words, the second attachment surface 535 faces the first side in the axial direction. The second attachment surface 535 is in contact with the support plate 51.

The second attachment surface 535 is different in surface roughness from the second slide surface 534. For example, the second attachment surface 535 is larger in surface roughness (arithmetic average roughness) than the second slide surface 534. For example, the second attachment surface 535 can be made larger in surface roughness relative to the second slide surface 534 by polishing the second slide surface 534 without polishing the second attachment surface 535.

As shown in FIG. 5, the first friction material 52 includes a plurality of first engaging recesses 521. The first engaging recesses 521 are disposed away from each other at intervals in the circumferential direction. When axially seen, the first engaging recesses 521 overlaps with the first engaging protrusions 515, respectively. The first engaging recesses 521 are provided on the support plate 51-side surface of the first friction material 52. The first engaging recesses 521 are recessed to the first side in the axial direction. It should be noted that in the presently preferred embodiment, the first engaging recesses 521 penetrate the first friction material 52 in the axial direction.

The first engaging recesses 521 are engaged with the first engaging protrusions 515 of the support plate 51, respectively. In other words, each first engaging protrusion 515 is disposed in each first engaging recess 521. It should be noted that a gap of about 0.05 to 0.30 mm is produced on one side of each first engaging protrusion 515 within each first engaging recess 521. The first engaging protrusions 515 and the first engaging recesses 521 are thus engaged with each other; hence, the first friction material 52 is unitarily rotated with the support plate 51. It should be noted that, when axially seen, each first engaging recess 521 has a circular shape.

More particularly, each first engaging recess 521 includes the small diameter portion 522 and the large diameter portion 523. The large diameter portion 523 is disposed on the first side of the small diameter portion 522 in the axial direction. The small diameter portion 522 and the large diameter portion 523 are connected with each other.

The small diameter portion 522 is opened toward the support plate 51. In other words, the small diameter portion 522 is opened to the second side in the axial direction. The small diameter portion 522 accommodates an engaging protrusion 515.

The large diameter portion 523 is opened to the opposite side of the support plate 51. In other words, the large diameter portion 523 is opened to the first side in the axial direction. When axially seen, the large diameter portion 523 is larger in dimension than the small diameter portion 522. In other words, the large diameter portion 523 is larger in diameter than the small diameter portion 522. The step between the large diameter portion 523 and the small diameter portion 522 is held down by the first hold-down portion **515*b* of the engaging protrusion 515**.

As shown in FIG. 6, the second friction material 53 includes a plurality of second engaging recesses 531. The second engaging recesses 531 are spaced apart from each other at intervals in the circumferential direction. When axially seen, the second engaging recesses 531 overlap with the second engaging protrusions 517, respectively. The second engaging recesses 531 are provided on the support plate 51-side surface of the second friction material 53. The second engaging recesses 531 are recessed to the second side in the axial direction. It should be noted that in the presently preferred embodiment, the second engaging recesses 531 penetrate the second friction material 53 in the axial direction.

The second engaging recesses 531 are engaged with the second engaging protrusions 517 of the support plate 51, respectively. In other words, each second engaging protrusion 517 is disposed in one of the second engaging recesses 531. It should be noted that a gap of about 0.05 to 0.60 mm is produced on one side of each second engaging protrusion 517 within each second engaging recess 531. The second engaging protrusions 517 and the second engaging recesses 531 are thus engaged with each other; hence, the second friction material 53 is unitarily rotated with the support plate 51. It should be noted that, when axially seen, each second engaging recess 531 has a circular shape.

More particularly, each second engaging recess 531 includes a large diameter portion 532 and a small diameter portion 533. The small diameter portion 533 is disposed on the second side of the large diameter portion 532 in the axial direction. The large diameter portion 532 and the small diameter portion 533 are connected to each other.

The large diameter portion 532 is opened toward the support plate 51. In other words, the large diameter portion 532 is opened to the first side in the axial direction. The large diameter portion 532 accommodates each second engaging protrusion 517.

The small diameter portion 533 is opened to the opposite side of the support plate 51. In other words, the small diameter portion 533 is opened to the second side in the axial direction. When axially seen, the small diameter portion 533 is smaller in dimension than the large diameter portion 532. In other words, the small diameter portion 533 is smaller in diameter than the large diameter portion 532. Additionally, when axially seen, the small diameter portion 533 is smaller in dimension than each second engaging protrusion 517.

According to this configuration, the front and back surfaces of the second friction material 53 are different in appearance from each other; hence, the second friction material 53 can be attached to the support plate 51 without being set in a wrong front-back orientation.

When a torque having a magnitude of greater than or equal to a predetermined value is inputted to the damper device 100, the friction disc 5 is rotated relative to the side plate 31 and the pressure plate 33, while being slid thereagainst through the first and second friction materials 52 and 53. On the other hand, when a torque having a magnitude of less than the predetermined value is inputted to the damper device 100, the friction disc 5 is unitarily rotated with the side plate 31 and the pressure plate 33.

[Torque Limiter Unit]

As shown in FIG. 2, the torque limiter unit 3 is disposed to be rotatable about the rotational axis O. The torque limiter unit 3 is disposed on the second side of the flywheel in the axial direction. The torque limiter unit 3 has an annular shape. The torque limiter unit 3 is attached to the flywheel.

The torque limiter unit 3 is configured to limit the amount of torque transmitted between the flywheel and the damper unit 4. In other words, the torque limiter unit 3 is configured to restrict transmission of the torque in the damper device 100 when the torque has a magnitude of greater than or equal to a predetermined value. The torque limiter unit 3 is configured to be engaged by friction with the friction disc 5. Additionally, the torque limiter unit 3 sandwiches the friction disc 5 therein in the axial direction.

The torque limiter unit 3 includes the side plate 31, a cover plate 32, the pressure plate 33, and a disc spring 34 (exemplary urging member).

The side plate 31 and the cover plate 32 are attached to the flywheel. The side plate 31 and the cover plate 32 are unitarily rotated with the flywheel. Each of the side plate 31 and the cover plate 32 has an annular shape. The cover plate 32 is disposed on the second side of the side plate 31 in the axial direction. The cover plate 32 is smaller in plate thickness than the side plate 31.

The pressure plate 33 has an annular shape. The pressure plate 33 is disposed axially between the side plate 31 and the cover plate 32. More particularly, the pressure plate 33 is disposed axially between the second friction material 53 and the disc spring 34. The pressure plate 33 is configured to be unitarily rotated with the side plate 31. It should be noted that the pressure plate 33 is axially movable with respect to the side plate 31.

The disc spring 34 is disposed axially between the cover plate 32 and the pressure plate 33. The disc spring 34 urges the pressure plate 33 to the first side in the axial direction. In other words, the disc spring 34 urges the pressure plate 33 toward the friction disc 5. Accordingly, the friction disc 5 is sandwiched by the pressure plate 33 and the side plate 31.

Figure 11:
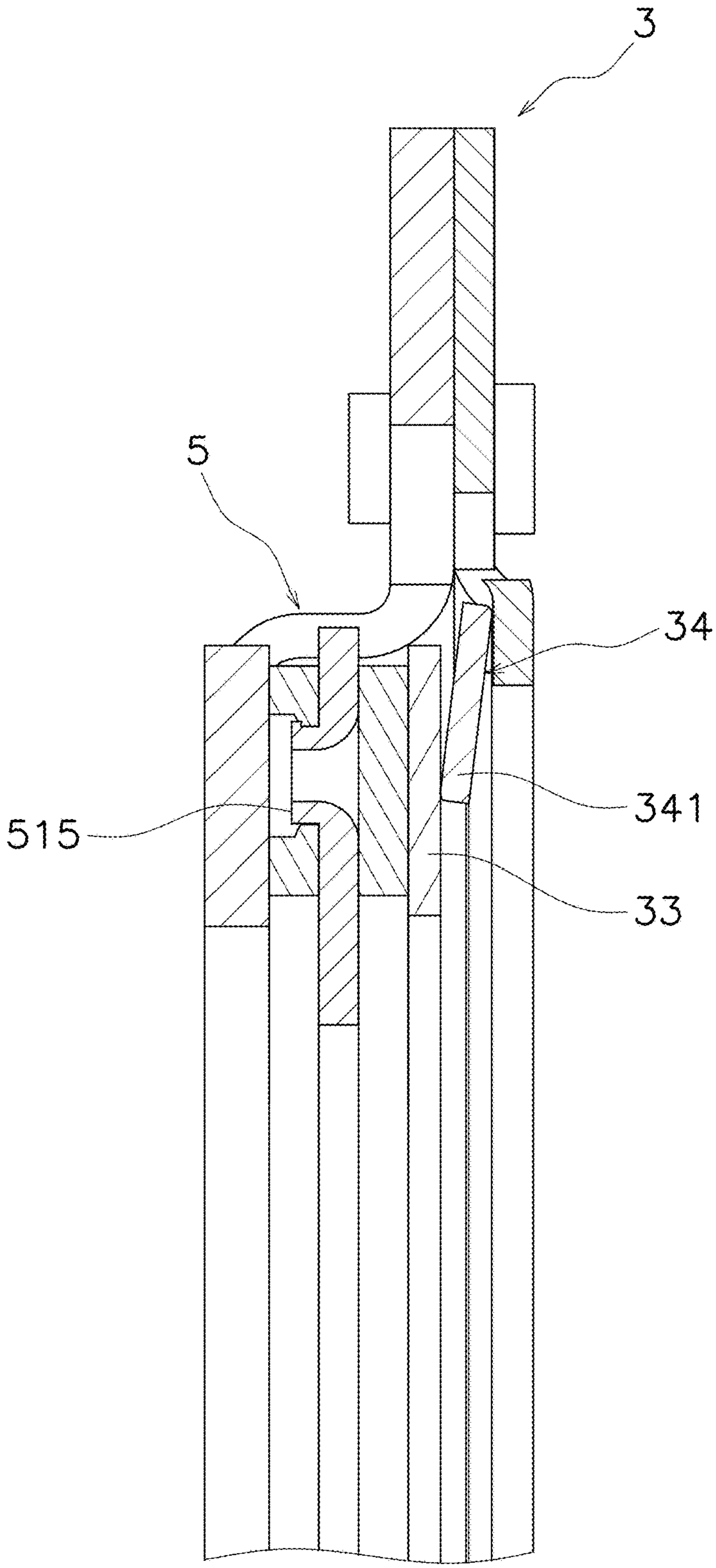
FIG. 11 is a cross-sectional view of a torque limiter unit and the friction disc.

FIG. 11 is a cross-sectional view of a relation of arrangement between the friction disc 5 and the torque limiter unit 3. As shown in FIG. 11, the disc spring 34 includes a contact portion 341. The contact portion 341 is in contact with the pressure plate 33. The contact portion 341 corresponds to either an inner peripheral portion or an outer peripheral portion of the disc spring 34. It should be noted that in the presently preferred embodiment, the inner peripheral portion of the disc spring 34 is provided as the contact portion 341. As axially seen, the contact portion 341 overlaps with the first engaging protrusions 515. In other words, the contact portion 341 is identical in radial position to the first engaging protrusions 515. It should be noted that, when axially seen, the contact portion 341 of the disc spring 34 overlaps with the second engaging protrusions 517 as well.

Modifications

The claimed invention is not limited to the preferred embodiment described above, and a variety of changes or modifications can be made without departing from the scope of the claimed invention. Moreover, modifications to be described are applicable simultaneously.

(a) In the preferred embodiment described above, the support plate 51 includes the anchors 514 protruding to only the first or second side in the axial direction; however, the support plate 51 is not limited in configuration to this.

Figure 12:
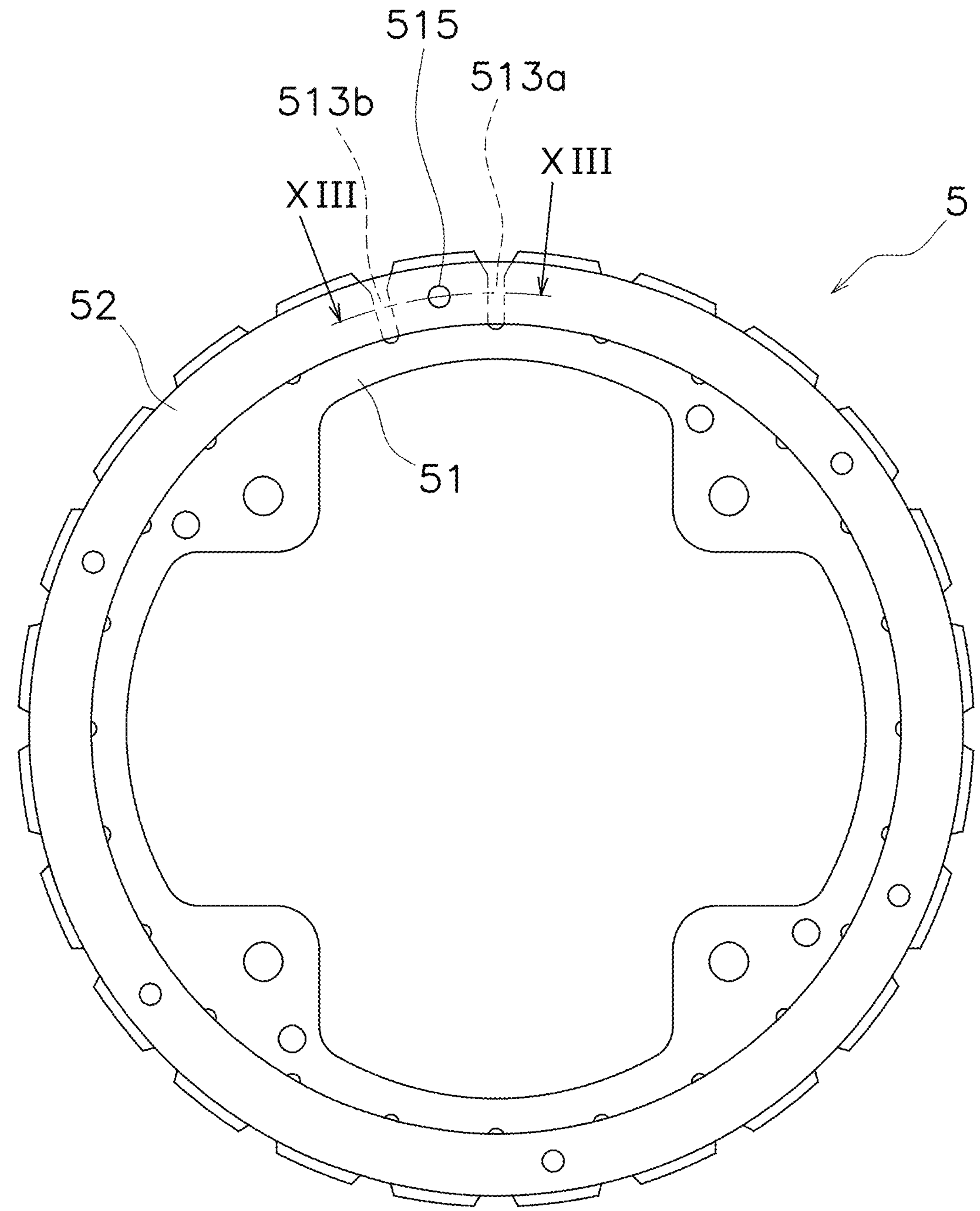
FIG. 12 is a front view of a friction disc according to a modification.
Figure 13:
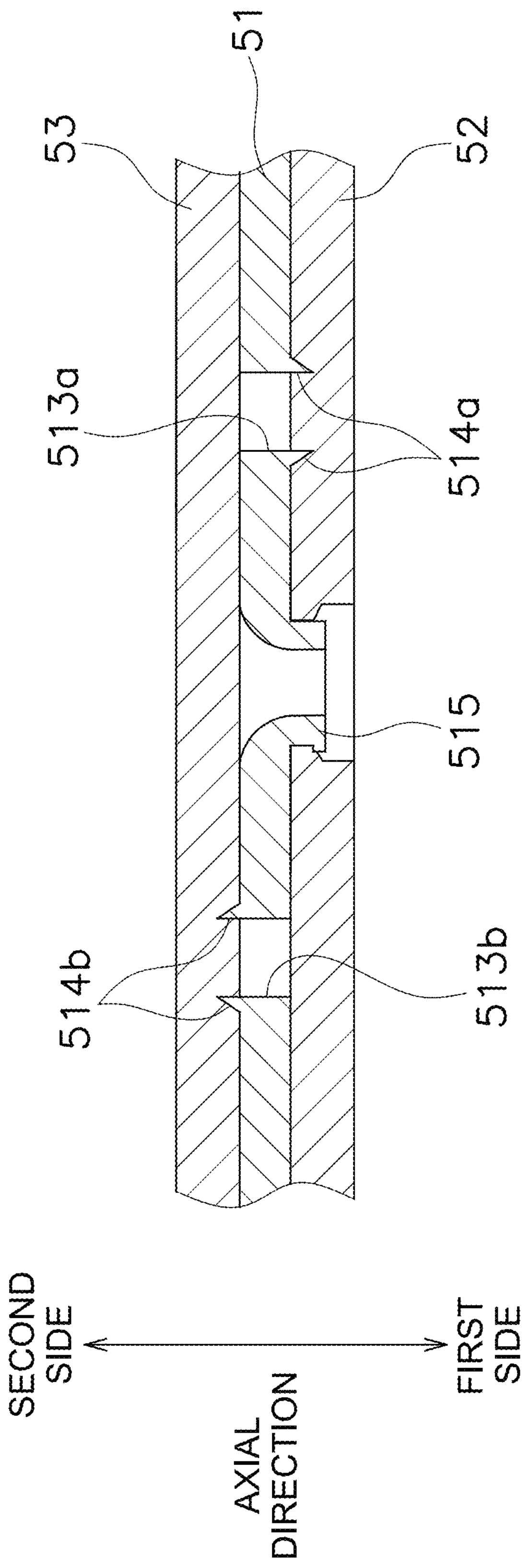
FIG. 13 is a cross-sectional view of the friction disc taken along line XIII-XIII in FIG. 12.

FIG. 12 is a front view of the friction disc 5, whereas FIG. 13 is a cross-sectional view of the friction disc 5 taken along line XIII-XIII in FIG. 12. As shown in FIGS. 12 and 13, the support plate 51 may include a plurality of first slits 513*a*, a plurality of second slits 513*b*, a plurality of first anchors 514*a*, and a plurality of second anchors 514*b*.

The first slits 513*a* and the second slits 513*b* are alternately disposed in the circumferential direction. The first slits 513*a* and the second slits 513*b* are spaced apart from each other at intervals in the circumferential direction.

Each first anchor 514*a* protrudes from the edge of a corresponding one of the first slits 513*a* to the first side in the axial direction. Each first anchor 514*a* bites into the first friction material 52.

Each second anchor 514*b* protrudes from the edge of a corresponding one of the second slits 513*b* to the second side in the axial direction. In other words, each second anchor 514*b* protrudes to the opposite side of each first anchor 514*a*. Each second anchor 514*b* bites into the second friction material 53. The first anchors 514*a* and the second anchors 514*b* are alternately disposed in the circumferential direction.

Each first engaging protrusion 515 is disposed between a pair of first and second slits 513*a* and 513*b* that are adjacent to each other in the circumferential direction. In other words, each first engaging protrusion 515 is disposed between a pair of first and second anchors 514*a* and 514*b* that are adjacent to each other in the circumferential direction. Likewise, each second engaging protrusion 517 is also disposed between a pair of first and second slits 513*a* and 513*b* that are adjacent to each other in the circumferential direction.

(b) In the preferred embodiment described above, the support plate 51 includes the anchors 514. However, the support plate 51 may not include the anchors 514.

(c) In the preferred embodiment described above, when axially seen, each of the first and second engaging protrusions 515 and 517 has a circular or elliptic shape. However, each of the first and second engaging protrusions 515 and 517 is not limited in shape to this. For example, when axially seen, each of the first and second engaging protrusions 515 and 517 may have a rectangular shape or, alternatively, any other suitable shape.

(d) In the preferred embodiment described above, the side plate 31 is disposed on the first side of the friction disc 5 in the axial direction, whereas the pressure plate 33 is disposed on the second side of the friction disc 5 in the axial direction. However, arrangement of the side plate 31 and the pressure plate 33 with respect to the friction disc 5 is not limited to this. For example, the side plate 31 may be disposed on the second side of the friction disc 5 in the axial direction, whereas the pressure plate 33 may be disposed on the first side of the friction disc 5 in the axial direction.

(e) In the preferred embodiment described above, the internal combustion engine is disposed on the first side of the damper device 100 in the axial direction, whereas the output-side member is disposed on the second side of the damper device 100 in the axial direction. However, the arrangement of the internal combustion engine and the output-side member with respect to the damper device 100 is not limited to this. For example, the internal combustion engine may be disposed on the second side of the damper device 100 in the axial direction, whereas the output-side member may be disposed on the first side of the damper device 100 in the axial direction.

LIST OF REFERENCE NUMERALS

3: Torque limiter unit, 4: Damper unit, 41: Input rotor, 42: Output rotor, 43: Elastic member, 5: Friction disc, 51: Support plate, 511: First lateral surface, 512: Second lateral surface, 513: Slit, 513*a*: First slit, 513*b*: Second slit, 514: Anchor, 514*a*: First anchor, 514*b*: Second anchor, 515: First engaging protrusion, 516: Through-hole, 517: Second engaging protrusion, 518: Recess, 52: First friction material, 521: First engaging recess, 522: Small diameter portion, 523: Large diameter portion, 53: Second friction material, 531: Second engaging recess, 532: Large diameter portion, 533: Small diameter portion, 100: Damper device

The invention claimed is:

1. A friction disc, comprising:

a support plate including a first lateral surface and a second lateral surface, the first lateral surface facing a first side in an axial direction, the second lateral surface facing a second side in the axial direction;

a first friction material attached to the first lateral surface of the support plate; and a second friction material attached to the second lateral surface of the support plate, wherein the support plate includes a first engaging protrusion protruding from the first lateral surface to the first side in the axial direction, the first engaging protrusion being integrally formed with the support plate as a single member, a through-hole extending inside the first engaging protrusion in the axial direction, a second engaging protrusion protruding from the second lateral surface to the second side in the axial direction, the second engaging protrusion being integrally formed with the support plate as a single member, and a recess disposed to overlap with the second engaging protrusion as seen in the axial direction, the recess recessed on the first lateral surface to the second side in the axial direction, the first friction material includes a first engaging recess engaged with the first engaging protrusion, and the second friction material includes a second engaging recess engaged with the second engaging protrusion.

2. The friction disc according to claim 1, wherein the first engaging protrusion includes a first body and a first hold-down portion, with the first body extending in the axial direction and the first hold-down portion extending from an outer peripheral surface of a distal end of the first body to hold down the first friction material.

3. The friction disc according to claim 1, wherein at least one of the first engaging protrusion and the second engaging protrusion has an elliptical shape as seen in the axial direction.

4. The friction disc according to claim 1, wherein the first engaging recess includes a small diameter portion opening toward the support plate in the axial direction, the small diameter portion accommodating the first engaging protrusion, and a large diameter portion connected to the small diameter portion in the axial direction, the large diameter portion opening toward an opposite side of the first friction material than the support plate, the large diameter portion being larger in dimension than the small diameter portion as seen in the axial direction.

5. The friction disc according to claim 1, wherein the second engaging recess includes a large diameter portion opening toward the support plate in the axial direction, the large diameter portion accommodating the second engaging protrusion, and a small diameter portion connected to the large diameter portion in the axial direction, the small diameter portion opening toward an opposite side of the second friction material than the support plate, the small diameter portion being smaller in dimension than the large diameter portion as seen in the axial direction, the small diameter portion being smaller in dimension than the second engaging protrusion as seen in the axial direction.

6. The friction disc according to claim 1, wherein the support plate includes a plurality of the first engaging protrusions and a plurality of the second engaging protrusions, and the plurality of first engaging protrusions and the plurality of second engaging protrusions are alternately disposed in a circumferential direction.

7. The friction disc according to claim 1, wherein the first friction material includes a first slide surface and a first attachment surface, the first slide surface facing the first side in the axial direction, the first attachment surface facing the second side in the axial direction, and the first attachment surface coming in contact with the support plate, and the first attachment surface is larger in surface roughness than the first slide surface.

8. A damper device, comprising:

a damper unit including an input rotor, an output rotor, an elastic member, and the friction disc recited in claim 1, the elastic member configured to elastically couple the input rotor and the output rotor, the friction disc attached to either the input rotor or the output rotor; and a torque limiter unit configured to be engaged by friction with the friction disc, the torque limiter unit sandwiching the friction disc therein in the axial direction.

9. The damper device according to claim 8, wherein the torque limiter unit includes a pressure plate and an urging member, the urging member urging the pressure plate toward the friction disc, the urging member includes a contact portion in contact with the pressure plate, and the contact portion overlaps with the first engaging protrusion as seen in the axial direction.

10. A friction disc comprising:

a support plate including a first lateral surface and a second lateral surface, the first lateral surface facing a first side in an axial direction, the second lateral surface facing a second side in the axial direction;

a first friction material attached to the first lateral surface of the support plate; and a second friction material attached to the second lateral surface of the support plate, wherein the support plate includes a first engaging protrusion protruding from the first lateral surface to the first side in the axial direction, a through-hole extending inside the first engaging protrusion in the axial direction, a second engaging protrusion protruding from the second lateral surface to the second side in the axial direction, and a recess disposed to overlap with the second engaging protrusion as seen in the axial direction, the recess recessed on the first lateral surface to the second side in the axial direction, the first friction material includes a first engaging recess engaged with the first engaging protrusion, and the second friction material includes a second engaging recess engaged with the second engaging protrusion, wherein the support plate includes 1) a slit extending inward in a radial direction from an outer peripheral surface of the support plate, and 2) an anchor protruding from an edge of the slit to the second side in the axial direction, the anchor biting into the second friction material.

11. A friction disc comprising:

a support plate including a first lateral surface and a second lateral surface, the first lateral surface facing a first side in an axial direction, the second lateral surface facing a second side in the axial direction;

a first friction material attached to the first lateral surface of the support plate; and a second friction material attached to the second lateral surface of the support plate, wherein the support plate includes a first engaging protrusion protruding from the first lateral surface to the first side in the axial direction, a through-hole extending inside the first engaging protrusion in the axial direction, a second engaging protrusion protruding from the second lateral surface to the second side in the axial direction, and a recess disposed to overlap with the second engaging protrusion as seen in the axial direction, the recess recessed on the first lateral surface to the second side in the axial direction, the first friction material includes a first engaging recess engaged with the first engaging protrusion, and the second friction material includes a second engaging recess engaged with the second engaging protrusion, wherein the support plate further includes a plurality of first slits disposed away from each other at intervals in a circumferential direction, each of the plurality of first slits extending inward in a radial direction from an outer peripheral surface of the support plate, a plurality of second slits disposed away from each other at intervals in the circumferential direction, each of the plurality of second slits extending inward in the radial direction from the outer peripheral surface of the support plate, a plurality of first anchors biting into the first friction material, each of the plurality of first anchors protruding from an edge of the each of the plurality of first slits to the first side in the axial direction, and a plurality of second anchors biting into the second friction material, each of the plurality of second anchors protruding from an edge of the each of the plurality of second slits to the second side in the axial direction.

12. The friction disc according to claim 11, wherein the plurality of first slits and the plurality of second slits are alternately disposed in the circumferential direction.

13. The friction disc according to claim 11, wherein at least one of the first engaging protrusion and the second engaging protrusion is/are disposed between one of the plurality of first slits and one of the plurality of second slits in the circumferential direction.

* * * * *